Sept. 2, 1958  KAIJI NEGORO  2,849,941
AUTOMOBILE VENTILATOR
Filed Nov. 13, 1953
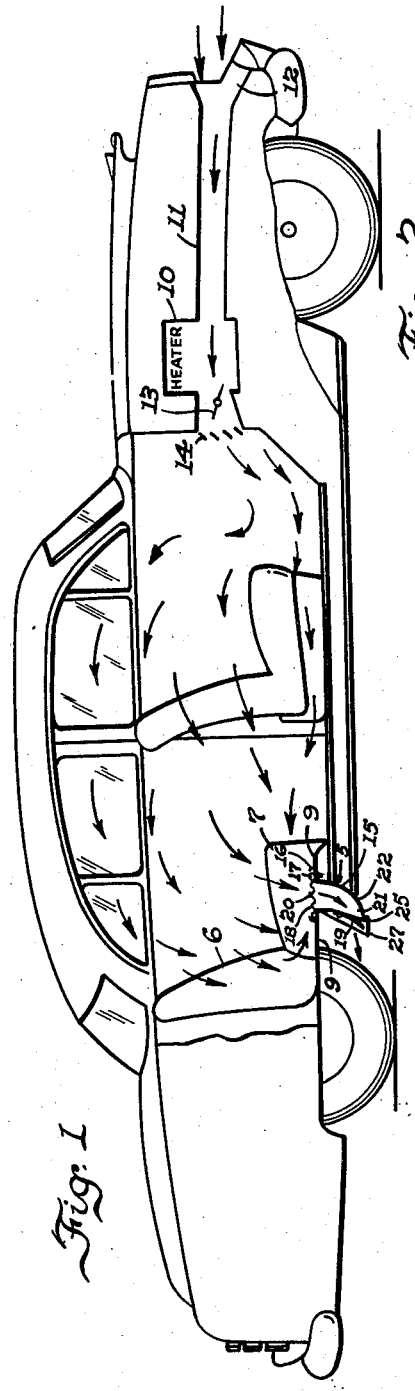
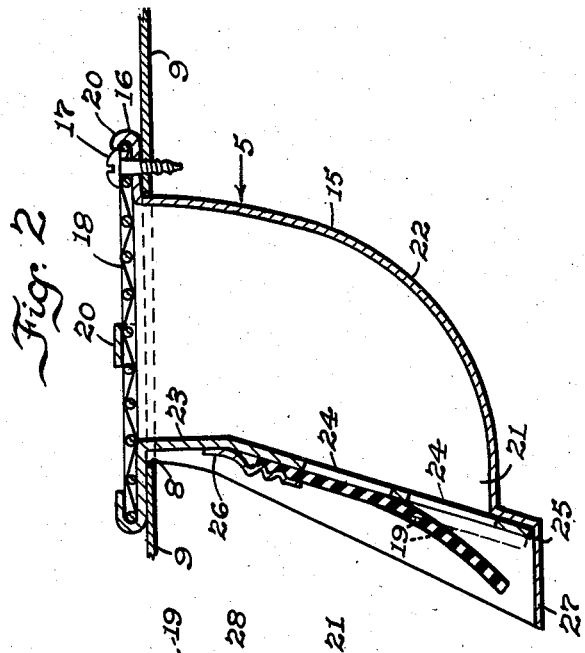
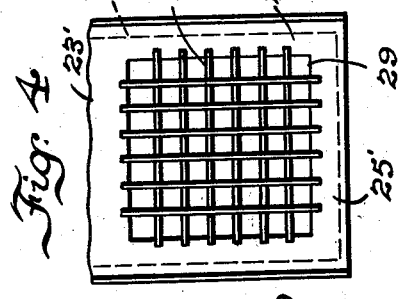
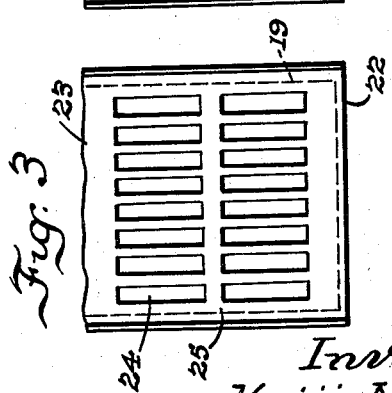
Inventor
Kaiji Negoro
Atty.

United States Patent Office 2,849,941
Patented Sept. 2, 1958

2,849,941

AUTOMOBILE VENTILATOR

Kaiji Negoro, Rockford, Ill.

Application November 13, 1953, Serial No. 391,952

5 Claims. (Cl. 98—2)

This invention relates to a new and improved automobile ventilator.

I am aware that considerable attention has been given the problem of ventilation in automobiles. However, many ventilators, like the wing type on the doors, for example, are objectionable because of the air rush noise and because of the unhealthy drafts created, and others require special settings of controls and will not function satisfactorily, if at all, unless these controls are set in a predetermined way. It is therefore the principal object of my invention to provide a ventilator of simple and inexpensive construction that can easily be applied to existing cars, if not provided as a part of the original equipment, and is designed to function properly at all times, in summer and winter alike, without requiring any attention on the part of the operator at any time, besides eliminating the objections previously mentioned.

The ventilator of my invention is installed under the back seat of a sedan or coach model car and has a novel type of rubber flap valve which tends to remain closed under the inherent resiliency of the sheet material of which the valve is made, so that it opens from its free end more or less toward its attached end depending upon the air pressure active against the inner side, whereby it serves as a relief valve to make it easier to close doors when the windows are all closed, besides serving its principal function in affording fresh air ventilation in cold as well as warm weather. The benefits derived from the use of this ventilator may be enumerated as follows:

(1) Cool air ventilation in summer without the necessity for opening windows and subjecting the passengers to wind;

(2) Fresh air ventilation combined with uniform heating in cold weather;

(3) Front to back circulation of air at all times so as to conduct away cigarette smoke and stale air from the driver and passengers;

(4) Freedom from air rush noises that interfere with the ease of conversation and good radio enjoyment, particularly at high car speeds;

(5) Diffused exhausting of air through the total rear seat area eliminates objectionable drafts and noise and at the same time induces cool air travel along the floor for maximum cooling effect in warm weather and warm air travel along the floor in the heating season for maximum comfort, the rear seat bottom location cooperating particularly efficiently with the widely adopted system of the "ram" intake of fresh air, in and out of heating seasons, and (6) There is no danger of any return flow under any circumstances with consequent fouling of the air in the car.

The invention is illustrated in the accompanying drawing, in which—

Fig. 1 is a more or less diagrammatic or phantom view of an automobile showing the conventional ram intake of fresh air and illustrating my improved ventilator installed on the pan under the middle of the rear seat cushion, the arrows serving to indicate the air circulation;

Fig. 2 is a vertical section through the ventilator showing in dotted lines the normally closed position of the resilient flap valve and in full lines a partially opened position;

Fig. 3 is a face view of the valve seat, and

Fig. 4 is a similar view of a modified construction.

The same reference numerals are applied to corresponding parts throughout the views.

Referring to the drawing, the reference numeral 5 designates my improved ventilator generally, the same being installed at the middle portion of the rear seat 6 under the central portion of the removable rear seat cushion 7, where a hole 8 of suitable size is made in the seat pan 9 to serve as the air exhaust or vent hole communicating with the ventilator 5. This location of the vent hole and ventilator is ideal because it insures full length travel of fresh air, cool or heated, as the case may be, from front to rear of the passenger space, and also insures that a good portion of such travel is close to the floor and hence at ankle level, thereby providing maximum passenger comfort alike in warm weather and cold weather operation, it being generally well recognized that the best cooling effect and also the best heating effect is obtainable at about ankle level. The fit of the seat cushion 7 is usually loose enough to allow fairly free flow of air around and under it through the opening 8, but the seat cushion cuts down the flow at all points all along the four sides of the cushion so that there will be no drafts. The flow is so widely distributed by reason of the seat cushion acting as a sort of baffle that the velocity is low at each point and there is accordingly no audible sound connected with the operation at any car speed. The air thus circulated is usually admitted in regulated amount by operation of a ventilator in front of the front seat, but even if such air is not supplied the circulation occurs to a smaller extent by reason of seepage of air around the doors and through any other openings as the car travels. The continual rearward circulation of air from the front seat area resulting from this location of the opening 8 is advantageous from the standpoint that cigarette smoke is immediately carried away from behind the windshield and does not bother the driver or passenger and interfere with good visibility. A heater is indicated diagrammatically at 10 as interposed in the air intake conduit 11. The latter has its front intake end 12 flared for easy entry of air, and at its rear end a butterfly valve 13 or other regulating means is provided and arranged to be adjusted manually to increase or decrease the air flow. Adjustable louvers 14 regulate the intake of air and also deflect the incoming air downwardly toward the floor. This heating and ventilating unit 10—14 is known as the "ram" intake unit and it provides fresh cool air or fresh heated air depending upon whether the heater 10 is turned off or on. Combining the delivery of the incoming air under a certain pressure directed downwardly toward floor level with the low level air vent and ventilator makes for high efficiency in operation in that it insures substantially the same ankle level cooling or heating at the back seat as at the front seat.

The ventilator 5 comprises an L-shaped elbow fitting 15 having a horizontal top flange 16 through holes in which self-tapping screws 17 are entered to fasten the flange to the pan 9 after the fitting has been inserted through the hole 8 from above. A protective screen 18 is preferably provided on top of the flange 16 to prevent anything from dropping into the fitting 15 that might possibly interfere with the freedom of operation of the flap valve 19. Lugs 20 on the edge portions of the flange 16 are bent over the edges of the screen to hold it in assembled relation to the fitting, but the screws 17 also serve to anchor it, as shown. The fitting has its exhaust or outlet end 21 directed to the rear so that the suction effect of the air flow rearwardly past the fitting as the car travels forwardly will to some extent help the valve 19 to open and to some extent also help to exhaust the outgoing air by entrainment in the air stream. The main body portion 22 of the fitting 15 is formed from a single piece of sheet metal bent to channel shape in horizontal section so as to provide three of the four side walls of said fitting, the fourth side wall being provided by another flat piece of sheet metal 23 welded or otherwise suitably secured in place closing the open side of the channel, except for the slots 24 provided in the lower portion 25 which defines a flat, preferably forwardly inclined, valve seat for engagement by flap valve 19. The flap valve 19 is made of sheet rubber, such as neoprene, with or without fabric reinforcement, and is of appreciable thickness and substantially square. It is suitably secured at its upper edge portion by a crimped metal strip 26 spot-welded to wall 23 and is designed to close under its inherent resilience, and, to some extent also, by gravity, as a result of the inclination of the seat 25 shown. The flat seat 25 supports the flap valve 19 against buckling and keeps it flat. The three-sided rim 27 extending rearwardly from the bottom and opposite sides of the seat 25 serves to protect the valve and seat from fouling by splash, splatter, dust and dirt from the road in the running of the car.

In operation, the ventilator should never require any attention unless it would be to clean it. There are no settings or adjustments to make. It is always ready for operation. In fact, it operates even before and after the car is running, because when the car door is slammed in entering and leaving, the sudden buildup in pressure is instantly relieved by wide opening of the flap valve 19, thereby making it much easier to close doors. When the car is running at higher speeds, the flap valve opens more or less from its lower end upwardly, and the extent of opening varies with the car speed, as the air pressure inside the car varies. As a result, this ventilator actually maintains a nearly constant pressure regardless of changes in car speed. The advantages derived were all specifically enumerated in the opening portion of this specification and need not be repeated here.

The one-piece slotted seat 25 is preferred but a flat wire screen 28 may be welded or otherwise suitably secured to a flat seat 25' covering a substantially square opening 29, as shown in Fig. 4, the seat 25' being on the lower portion of a wall 23' that is otherwise the same as that shown at 23 in Fig. 2. Screen 28 is also adapted to support flap valve 19 against buckling and keep it flat. The extent to which the flap valve 19 is designed to overlap the marginal portions of the seats 25 and 25' is indicated in dotted lines in Figs. 3 and 4.

It is believed the foregoing description conveys a good understanding of the objects and advantages of my invention. The appended claims have been drawn to cover all legitimate modifications and adaptations.

I claim:

1. The combination with an automobile having a body compartment elongated in a fore and aft direction and having a substantially horizontal seat pan in the rear portion over which a seat cushion is loosely supported allowing restricted air flow around and under the same, said pan having an opening provided therein adapted to serve as an outlet opening for air for ventilation purposes, said seat cushion covering said opening but allowing restricted air flow around and under the seat from the body compartment to said outlet opening for diffused ventilation of the rear portion of said body compartment, of a rearwardly opening ventilator for said body compartment mounted to project downwardly from said pan and communicating with said opening.

2. The combination with an automobile having a body compartment elongated in a fore and aft direction and having a substantially horizontal seat pan in the rear portion over which a seat cushion is loosely supported allowing restricted air flow around and under the same, said pan having an opening provided therein adapted to serve as an outlet opening for air for ventilation purposes, of a ventilator for said body compartment mounted to project downwardly from said pan and communicating with said opening, said ventilator comprising a generally L-shaped hollow fitting and providing a substantially vertical tubular inlet portion into the top of which said opening opens and a substantially horizontal tubular outlet portion extending rearwardly from the lower portion of said inlet portion, whereby the air flow under the automobile past said fitting in the forward travel of the automobile assists the exhausting of air from said compartment, and a valve normally closing said outlet portion but shielded against wind pressure at its marginal edges by surrounding edge portions of the outlet end of the said outlet portion and openable in response to difference in pressure between the inside and outside of said fitting.

3. The combination with an automobile having a body compartment elongated in a fore and aft direction and having in the rear portion an outlet opening provided therein, of a ventilator for said body compartment disposed under and communicating with said opening, said ventilator comprising a generally L-shaped hollow fitting and providing a substantially vertical tubular inlet portion into the top of which said opening opens and a substantially horizontal tubular outlet portion extending rearwardly from the lower portion of said inlet portion, whereby the air flow under the automobile past said fitting in the forward travel of the automobile assists the exhausting of air from said compartment, and a valve normally closing said outlet portion but shielded against wind pressure at its marginal edges by surrounding edge portions of the outlet end of the said outlet portion and openable solely in response to difference in pressure between the inside and outside of said fitting.

4. The combination with an automobile having a body compartment elongated in a fore and aft direction and having in the rear portion an outer opening provided therein, of a ventilator for said body compartment disposed under and communicating with said opening, said ventilator comprising a generally L-shaped hollow fitting and providing a substantially vertical tubular inlet portion into the top of which said opening opens and a substantially horizontal tubular outlet portion extending rearwardly from the lower portion of said inlet portion, whereby the air flow under the automobile past said fitting in the forward travel of the automobile assists the exhausting of air from said compartment, and a normally flat, inherently resilient flap valve secured in place on said fitting at one edge portion and normally engaging a flat seat on the outer side of said outlet portion closing said portion but adapted to be deflected at its free edge portion outwardly from said seat to a more or less open position solely in response to difference in pressure between the inside and outside of said fitting, said flap valve being shielded against wind pressure at its marginal edges by surrounding edge portions of the outlet end of the said outlet portion.

5. The combination with an automobile having a body compartment elongated in a fore and aft direction and having in the rear portion an outlet opening provided therein, of a ventilator for said body compartment disposed under and communicating with said opening, said ventilator comprising a generally L-shaped hollow fitting and providing a substantially vertical tubular inlet portion into the top of which said opening opens and a substantially horizontal tubular outlet portion extending rearwardly from the lower portion of said inlet portion, whereby the air flow under the automobile past said fitting in the forward travel of the automobile assists the exhausting of air from said compartment, and a normally flat, inherently resilient flap valve secured in place on said fitting at one edge portion and normally engaging a flat seat on the outer side of said outlet portion closing said portion but adapted to be deflected at its free edge portion outwardly from said seat to a more or less opened position solely in response to difference in pressure between the inside and outside of said fitting, the outlet portion including a rearwardly extending tubular shield portion enclosing the valve and seat to shield the marginal edges of said flap valve against wind pressure and at the same time afford protection for the valve and seat from foreign matter from the road in the travel of the automobile.

References Cited in the file of this patent

UNITED STATES PATENTS

| | | |
|---|---|---|
| 171,611 | Godley | Dec. 28, 1875 |
| 293,578 | Jones | Feb. 12, 1884 |
| 1,674,535 | Verville | June 19, 1928 |
| 1,758,573 | Lucke | May 13, 1930 |
| 2,022,959 | Gordon | Dec. 3, 1935 |
| 2,089,496 | Liber | Aug. 10, 1937 |
| 2,139,014 | Greig | Dec. 6, 1938 |
| 2,203,477 | Wahlberg | June 4, 1940 |
| 2,237,477 | Colvin | Apr. 8, 1941 |
| 2,372,377 | Hans | Mar. 27, 1945 |
| 2,631,518 | Brandenbrug | Mar. 17, 1953 |
| 2,670,671 | Haltenberger | Mar. 2, 1954 |

UNITED STATES PATENT OFFICE
CERTIFICATE OF CORRECTION

Patent No. 2,849,941 September 2, 1958

Kaiji Negoro

It is hereby certified that error appears in the printed specification of the above numbered patent requiring correction and that the said Letters Patent should read as corrected below.

Column 4, line 40, for "outer" read -- outlet --; line 55, for "open" read -- opened --.

Signed and sealed this 11th day of November 1958.

(SEAL)
Attest:

KARL H. AXLINE
Attesting Officer

ROBERT C. WATSON
Commissioner of Patents